No. 876,151.

PATENTED JAN. 7, 1908.

C. R. DODGE.
VEHICLE AXLE LUBRICATOR.
APPLICATION FILED APR. 8, 1907.

Witnesses.
O. M. Offutt
M. E. Moore

Claud R. Dodge,
Inventor,
by Wm. J. Moore
Attorney

UNITED STATES PATENT OFFICE.

CLAUDE RANKIN DODGE, OF WONDER, NEVADA.

VEHICLE-AXLE LUBRICATOR.

No. 876,151.  Specification of Letters Patent.  Patented Jan. 7, 1908.

Application filed April 8, 1907. Serial No. 366,961.

*To all whom it may concern:*

Be it known that I, CLAUDE RANKIN DODGE, a citizen of the United States, residing at Wonder, in the county of Churchill and State of Nevada, have invented certain new and useful Improvements in Vehicle-Axle Lubricators, of which the following is a specification.

My invention relates to improvements in vehicle axle lubricators, and has for its object to provide a simple and practical form of oil cup which may readily and with very little trouble be attached to the hubs of the vehicle wheels, and will serve to keep the wheels in properly lubricated condition at all times.

Another object of my invention is the provision of lubricating means for vehicle wheels which will insure of the lubricating agent coming in positive contact with the journal parts to keep them in smooth running condition, the holder or cup for the lubricant being of such structure and being applied to the wheel in such manner that the cup may be recharged at any time no matter what position the wheel occupies, so that it will not be necessary to jack the vehicle up and turn the wheel until the cup is vertical.

A further object of my invention is to provide competent means to prevent the entrance of dust or foreign matter to the axle skein by way of the lubricator cup, and to provide means for cleaning the oil opening in the hub of the wheel each time the wheel is oiled.

With the above and other objects in view, my invention consists of a lubricant cup adapted for application to the hub of a wheel said cup having removable connection with the hub so that it may be readily removed and re-filled, and also provided with suitable means for cleaning the lubricating opening in the hub.

Figure 1:
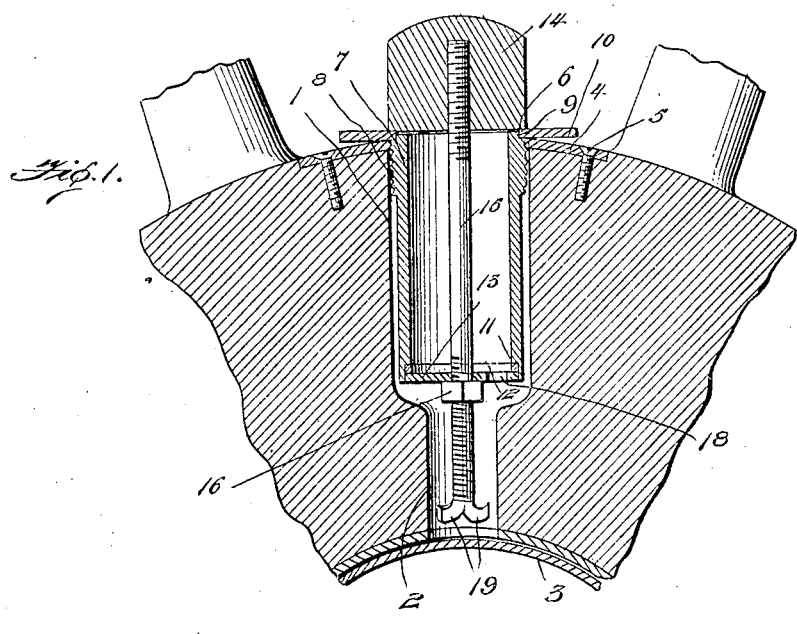
Figure 2:
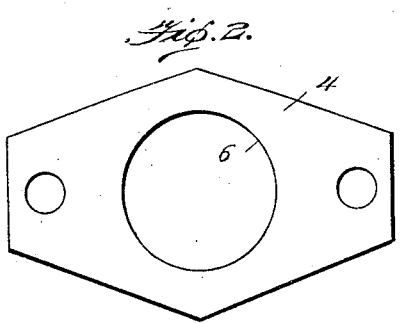
Figure 3:
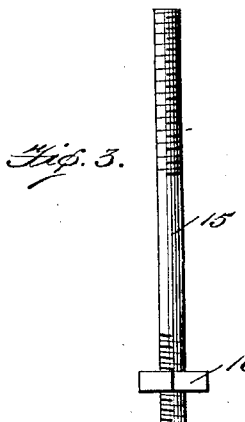
Figure 4:
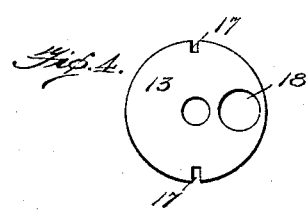
Figure 5:

My invention further embodies certain other novel features of construction, combination and arrangement of parts substantially as disclosed herein and as illustrated in the accompanying drawings, in which:

Figure 1, is a sectional view of my improved lubricator as applied to the hub of a wheel. Fig. 2, is a plan view of the securing plate by means of which the lubricator is held in position in the hub. Fig. 3, is an elevation of the stem or cleaner rod of the lubricator. Fig. 4, is a plan view of the bottom plate to the cup, and Fig. 5, is a like view of the washer which serves as a gasket to provide a tight joint between the shell of the cup and the bottom plate thereof.

While my invention is particularly useful and desirable for use on heavy wagons such as are used for freighting purposes, as it will save a great deal of time and labor in the oiling of the wagons as well as insure the use of the proper amount of lubricant without any waste or deficiency, it will be understood that it may be applied to the lighter types of vehicles as well and with the same good results.

In applying the lubricator to the hub of the wheel, a comparatively large opening 1, is formed in the hub about mid-length thereof, this larger opening terminating in a smaller neck or passage 2, which is in direct communication with the axle skein or thimble 3. A securing or attachment plate 4, which is curved to conform to the arc of the hub, is secured thereto by screws or other suitable fastenings 5, this plate having a central threaded opening 6, therethrough in alinement with the larger opening in the hub but slightly smaller than the bore of said opening. The body portion of the lubricator cup consists of a cylindrical shell 7, this shell having an exterior threaded portion 8, near its upper end for engagement with the threaded opening in the securing plate, the threaded portion terminating slightly inward from the upper end of the shell, to provide a plain annular end portion 9, upon which is engaged a washer 10, of leather or other suitable compressible material, to form a dust protector. The lower end of the shell is interiorly shouldered as at 11, to receive the split packing ring or gasket 12, and the plate 13, which forms the bottom to the cup. The cap or finger hold 14, forms the top to the cup and in order to clamp the parts together, I employ the bolt rod 15, which is oppositely threaded upon its ends to engage the cap 14 at the upper end, and a nut 16 is mounted upon its lower portion to clamp the bottom in place. The bottom plate is provided with notches 17, in its edges to engage and interlock with corresponding lugs on the end of the shell to secure the plate against turning, and a filling and exit opening 18, is also formed in the plate, to provide an entrance and exit for the lubricating agent.

The smaller passage or oil conduit in the hub is liable to become clogged with dirt and tarry products sooner or later, so in order to obviate this difficulty, I form the bolt rod with the split lower end or wings 19, which conform to the general shape of an auger bit, so that as the cup is being unscrewed for removal and re-charging, the wings gather up the foreign or hard material in the oil conduit and leave the same perfectly clear.

If it is desired to oil a wheel equipped with my improvements, it is not necessary that the wheel occupy such a position that the oil cup be vertical or even right side up, as if, for instance, the oil cup be upside down, the cup is simply unscrewed, re-filled through the opening in the bottom thereof, replaced in the hub, and the oil is properly distributed as the hub revolves. If the cup be in an upright position and it is desired to recharge it and lubricate the wheel, the lubricant may be poured direct in the opening in the hub and the cup be replaced.

The oil from the cup gradually works out through the opening in the bottom plate of the cup and fills the oil passage so that a plentiful supply of the lubricant is retained in contact with the axle.

From the foregoing description taken in connection with the drawings, the many advantages and usefulness of my invention will be readily appreciated, and it will be evident that I have provided a vehicle axle lubricator which accomplishes all the results herein set forth as the objects of the invention in a thoroughly practical and efficient manner.

I claim:

1. A hub formed with a bore terminating in an oil passage, a securing plate applied to the hub, a cup received in the bore and having threaded engagement with the securing plate, a removable bottom to the cup having an opening therethrough, and a bolt rod for securing the parts of the cup together, said rod having an auger extension for cleaning the oil passage.

2. An oil cup comprising a cylindrical barrel, removable ends to the barrel, one of said ends having an oil outlet therein, and a rod extending through said ends to clamp the parts together, and means on the exterior of the barrel for securing the cup in place.

3. An oil cup for vehicle axles having removable ends and a clamping rod extending through the cup for securing the ends in place, said clamping rod having a split end forming an auger extension on the end thereof.

4. A hub having a bore therein terminating in an oil passage, a securing plate on the hub surrounding said bore, a cup having threaded engagement with said plate and provided with removable ends, a clamping rod for securing the ends together, said rod having an auger extension adapted to project in the oil passage.

In testimony whereof I affix my signature in presence of two witnesses.

CLAUDE RANKIN DODGE.

Witnesses:
ALICE KUNZ,
RUSSELL T. JOY.